No. 871,522. PATENTED NOV. 19, 1907.
J. R. PEIRCE.
LATHE FOR MARBLE OR THE LIKE.
APPLICATION FILED APR. 13, 1907.
5 SHEETS—SHEET 1.
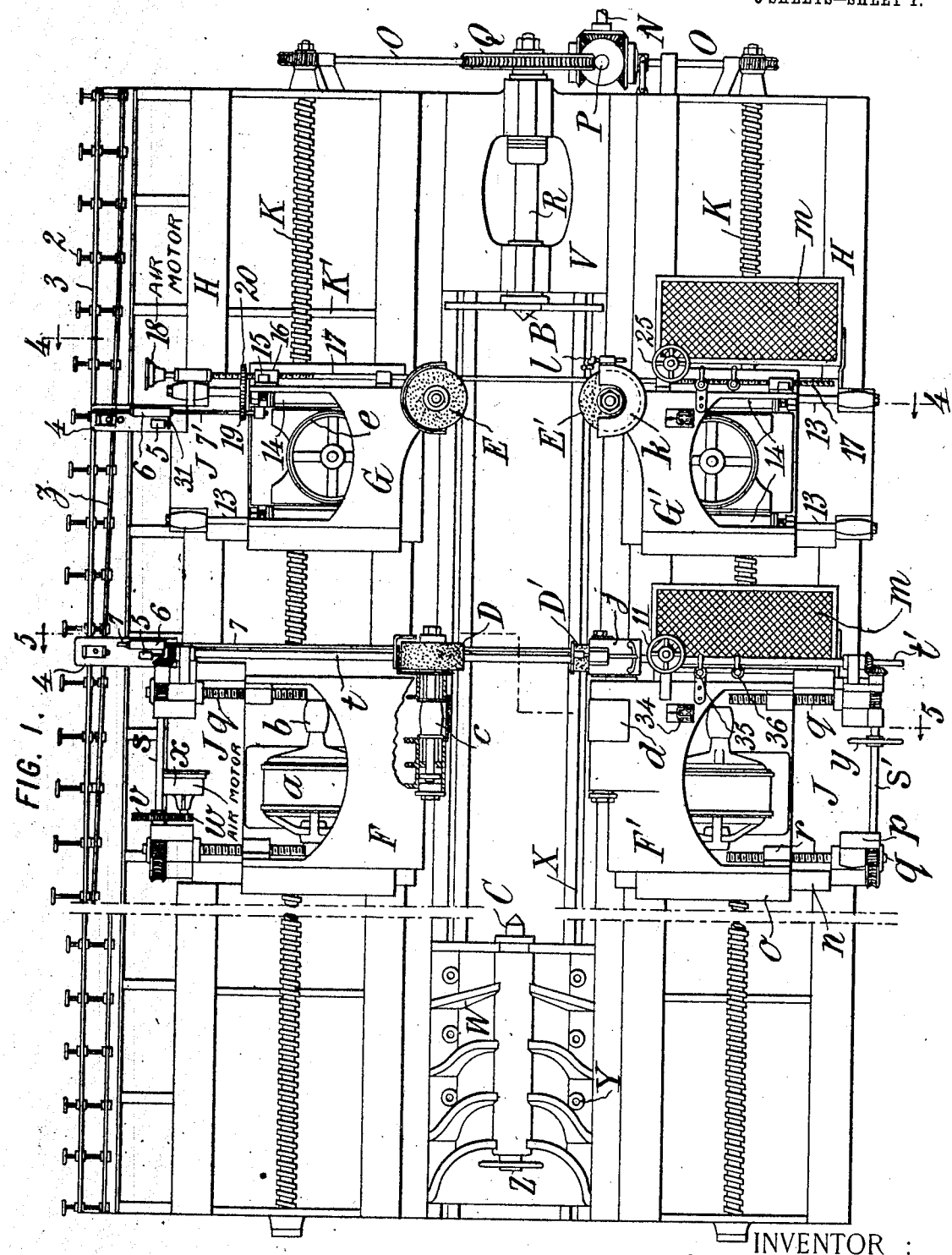
WITNESSES:
INVENTOR:
John Hayden Peirce,
By Attorneys No. 871,522. PATENTED NOV. 19, 1907.
J. R. PEIRCE.
LATHE FOR MARBLE OR THE LIKE.
APPLICATION FILED APR. 13, 1907.
5 SHEETS—SHEET 2.
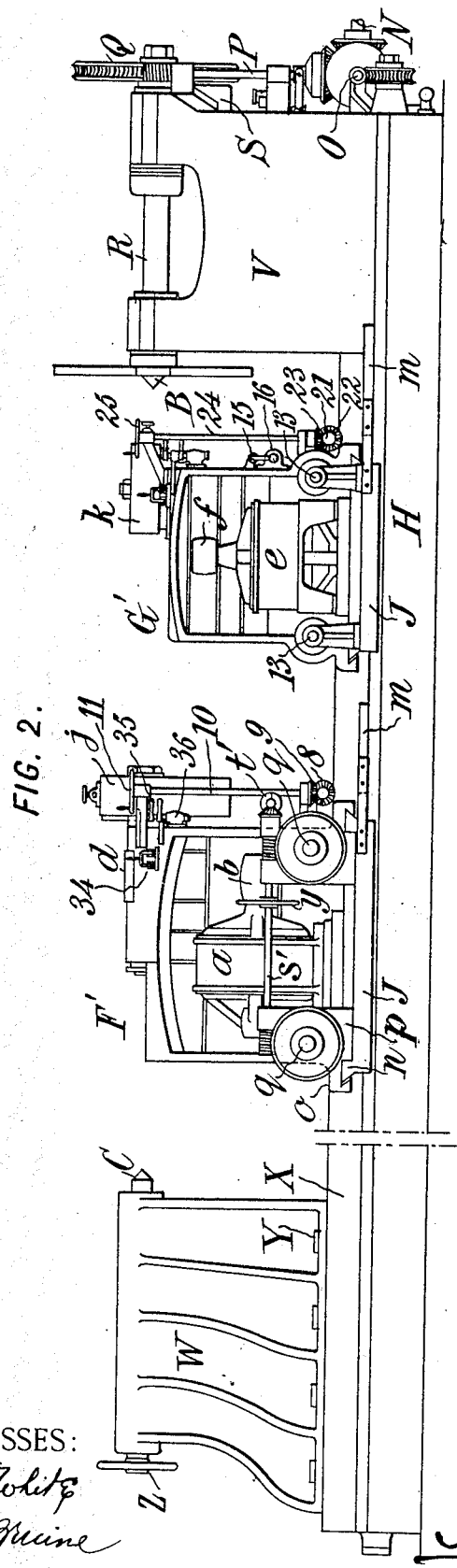
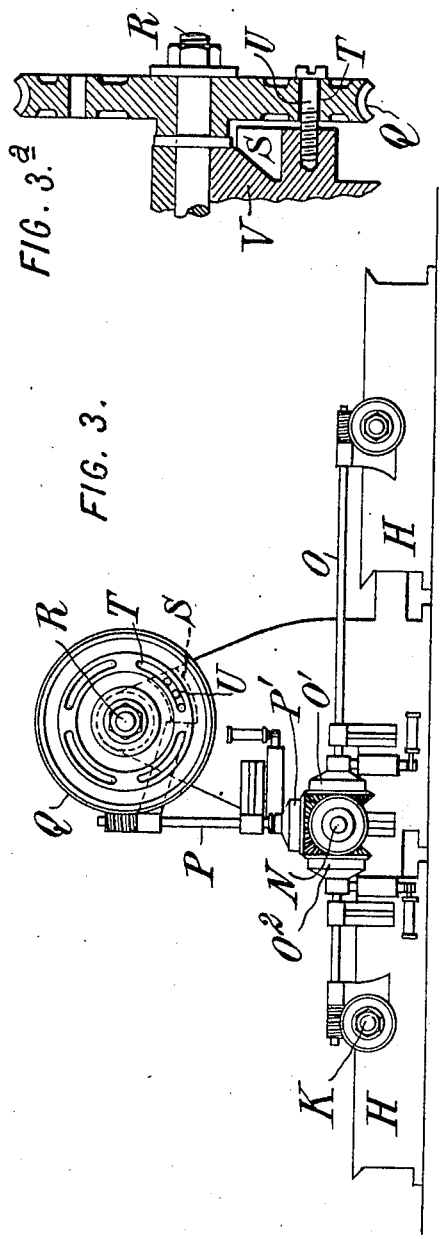
WITNESSES:
INVENTOR:
John Royden Peirce,
By Attorneys,

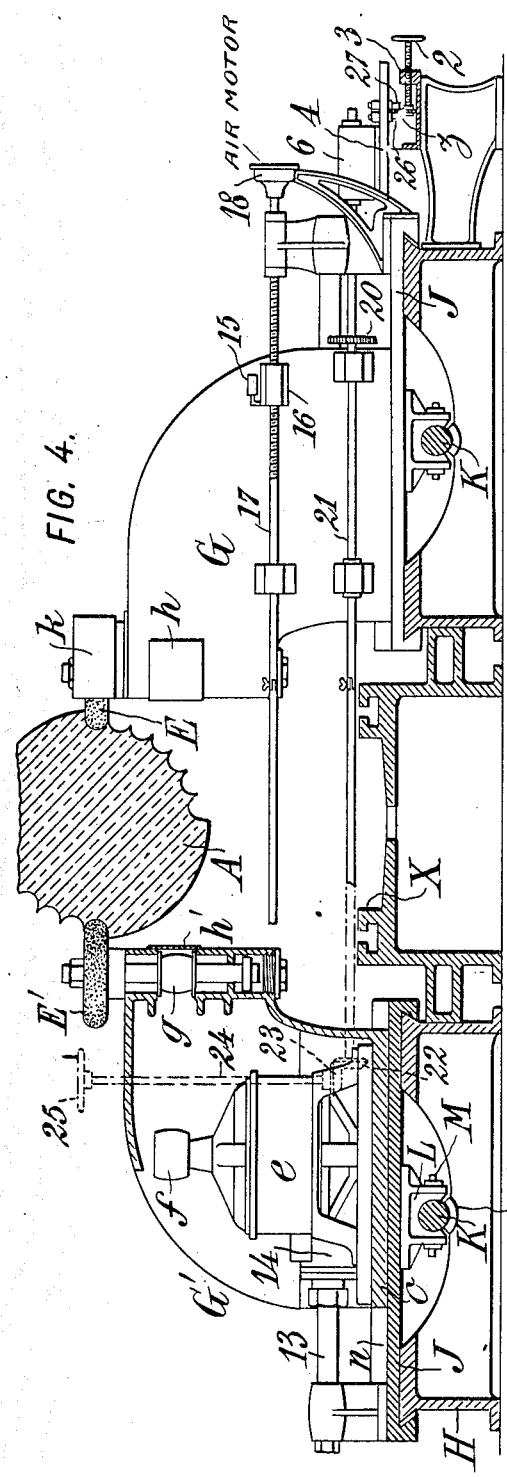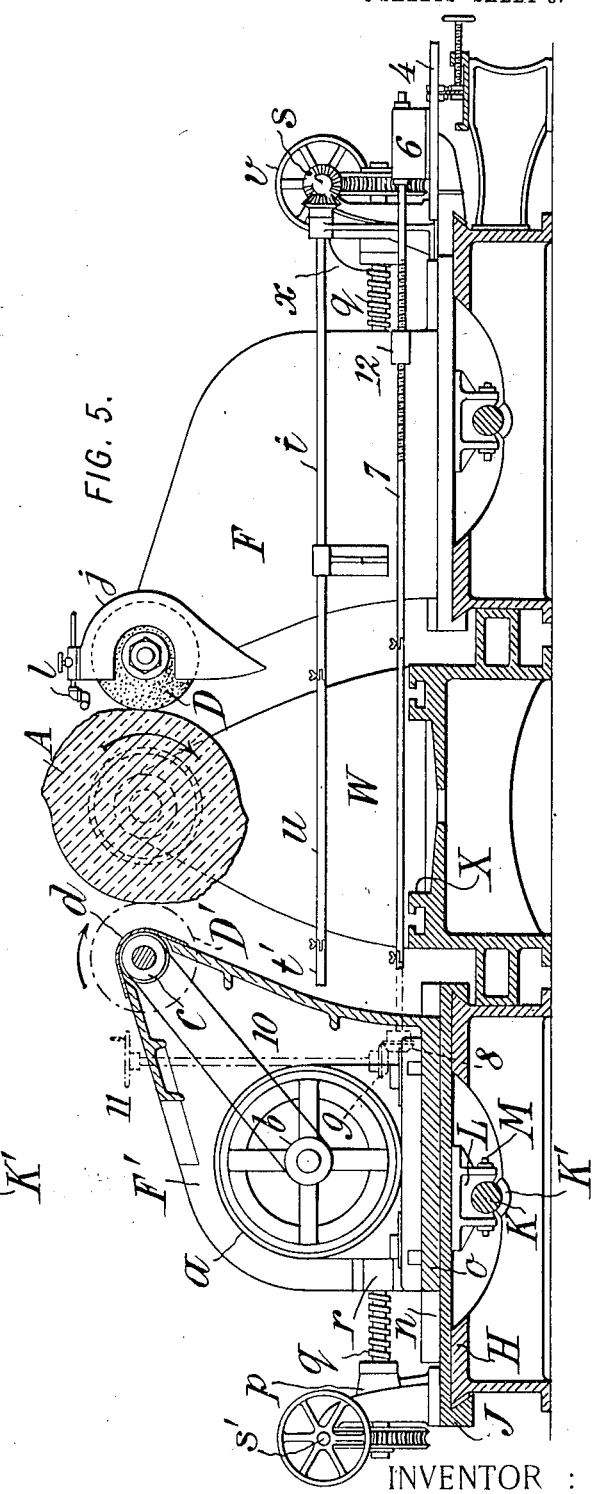

No. 871,522. PATENTED NOV. 19, 1907.
J. R. PEIRCE.
LATHE FOR MARBLE OR THE LIKE.
APPLICATION FILED APR. 13, 1907.
5 SHEETS—SHEET 4.
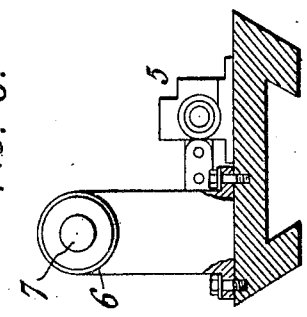
FIG. 8.
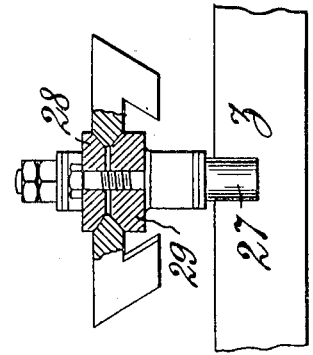
FIG. 9.
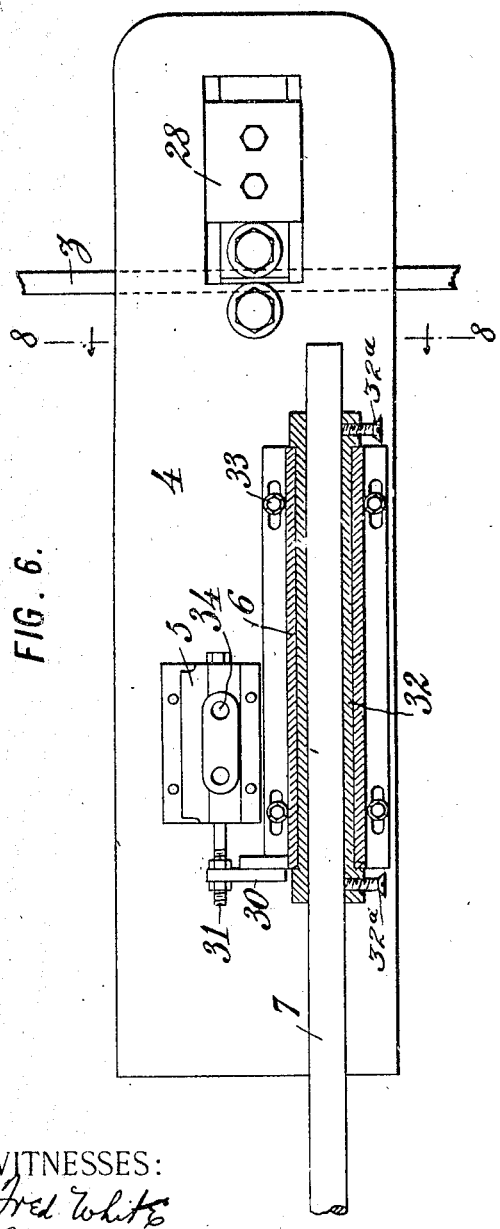
FIG. 6.
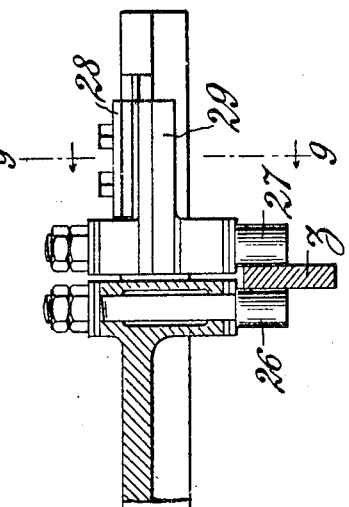
FIG. 7.
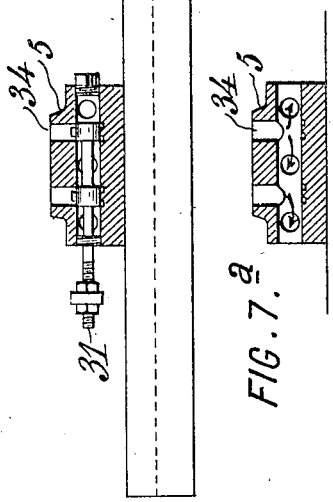
FIG. 7ª.
WITNESSES:
Fred White
René Buine
INVENTOR:
John Royden Peirce
By Attorneys,
Arthur C. Fraser & Usina

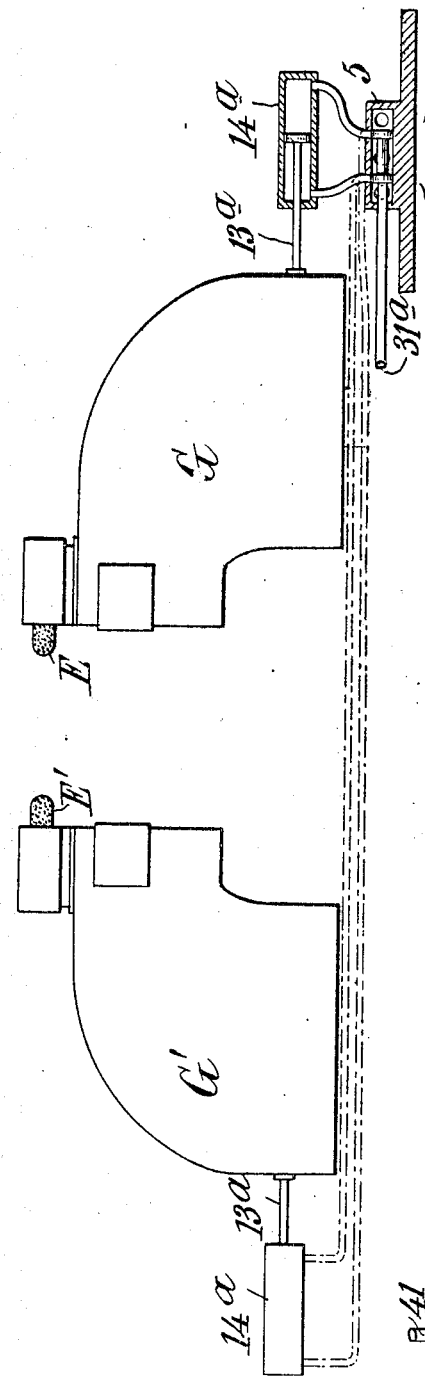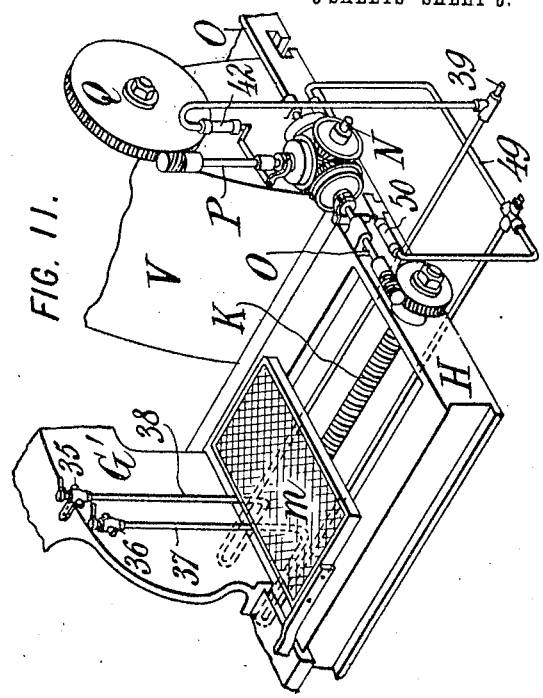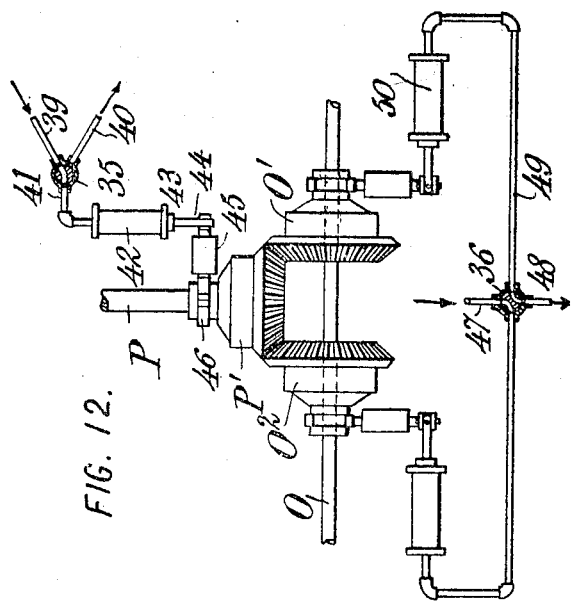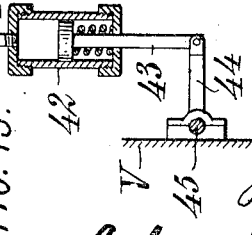

UNITED STATES PATENT OFFICE.

JOHN ROYDEN PEIRCE, OF NEW YORK, N. Y., ASSIGNOR TO ROYDEN MARBLE MACHINERY COMPANY, OF NEW YORK, N. Y., A CORPORATION OF NEW JERSEY.

LATHE FOR MARBLE OR THE LIKE.

No. 871,522.  Specification of Letters Patent.  Patented Nov. 19, 1907.

Application filed April 13, 1907. Serial No. 367,931.

*To all whom it may concern:*

Be it known that I, JOHN ROYDEN PEIRCE, a citizen of the United States, residing in the borough of Manhattan, city, county, and State of New York, have invented certain new and useful Improvements in Lathes for Marble or the Like, of which the following is a specification.

My invention aims to provide an apparatus for cheaply and expeditiously turning marble and similar building or ornamental stone, and for working columns or the like turned out of such stone.

The marble is held between end chucks and rotated in engagement with rounding cutters to bring it to the desired rounded contour, and which are moved longitudinally so as to turn the entire length of the work, the rounding cutters being preferably moved automatically in a transverse direction simultaneously with their forward movement so as to vary the diameter at different points in the length of the column. Preferably also these cutters are manually adjustable so as to produce a determined diameter at any desired point in their longitudinal travel.

Preferably fluting cutters are arranged to move longitudinally along the side of the column and to be simultaneously and automatically moved transversely to follow or produce the longitudinal contour desired, and to be adjusted for any desired diameter at a given point. Generally the work will be rotated while the rounding cutters are in operation, and will be stationary while the fluting cutters are in operation. While the rounding cutters are in use the fluting cutters will ordinarily be moved beyond an end of the column so as to be out of the way; and the rounding cutters will be similarly moved out of the way during the fluting operation.

The rounding cutters are preferably rapidly rotating carborundum wheels having their axes parallel with the axis of the column. The fluting cutters are preferably similar wheels but with rounded edges, and having their axes perpendicular to the axis of the column.

Various features of improvement are referred to in detail hereinafter.

The accompanying drawings illustrate an embodiment of the invention:

Figure 1 is a plan of the entire machine with its central portion omitted; Fig. 2 is a side elevation; Fig. 3 is an end elevation; Fig. 3ª is a sectional detail; Fig. 4 is a section approximately on the line 4—4 of Fig. 1; Fig. 5 is a section approximately on the line 5—5 of Fig. 1; Fig. 6 is a plan partly in section of the device for communicating the desired transverse movement to the carriages; Fig. 7 is a longitudinal section thereof; Fig. 7ª is a section of the valve, omitting its piston; Fig. 8 is a section on the line 8—8 of Fig. 6; Fig. 9 is a section on the line 9—9 of Fig. 7; Fig. 10 is a diagram of a transverse-movement mechanism; Fig. 11 is a perspective view of the pneumatic mechanism controlling rotation of the work and the longitudinal feed of the carriages. Fig. 12 is a diagram of the valve mechanism. Fig. 13 is a sectional detail of part of Fig. 12.

Referring to the embodiment of the invention illustrated, the work A is held between the two end chucks B and C. The machine may be one sided, that is to say, it may have a single rounding cutter and a single fluting cutter, these two being arranged either upon the same side of the work, or upon opposite sides. Or one cutter of each type may be arranged at each side of the work, as, for example, the rounding cutters D, D' with flat edges and consisting of carborundum wheels mounted on shafts parallel with the axis of the work, and the carborundum fluting wheels E, E' of any desired contour on their edges and arranged with their shafts vertical or otherwise transverse to the axis of the work. The cutters of any pair as D, D' or E, E' may be of the same material and fineness so as to merely double the rapidity with which the work is completed, or they may be of different materials and finenesses, one a coarse roughing wheel for example, and the other a fine finishing wheel.

The respective wheels are carried on carriages F, F', G, G' arranged to move in a longitudinal direction (that is, parallel with the axis of the work,) upon beds H, the bases J of the carriages being arranged to slide upon the beds as in the manner indicated in Figs. 4 and 5. The longitudinal movement of the carriages is effected by means of worm shafts K resting upon supports K' at intervals and engaging nuts L which are held in suitable sockets in the bases J by means of clamping bolts M. Upon the removal of the bolts M fastening any particular nut L in place, the nut may be withdrawn endwise and the further rotation of the shaft will have no effect upon the corresponding carriage. Thus any one or more of the carriages may be operated together.

The beds H extend beyond the inner ends of the chucks B and C a distance approximately equal to or greater than the longitudinal dimension of the carriages so that by disengaging a carriage F from its shaft K and retaining the carriage G in connection with the shaft, the latter carriage may be withdrawn to such a position as to avoid interference with the carriage F. In the withdrawn position the carriage G will be detached from the shaft K and the carriage F put into connection therewith.

The main driving shaft N operates the cross shaft O which, by means of a worm gear, drives the shafts K. The main shaft also drives a vertical shaft P (Fig. 3) which is connected by a worm with a disk Q. This disk is fast on the shaft R of the chuck B. A segmental block or lug S, the outline of which is indicated in dotted lines in Fig. 3 is provided with bolt holes U registering with curved slots T in the disk Q so that by means of a bolt passing into one or other of the bolt holes U and through the slots T, the shaft may be firmly clamped at any desired angle of adjustment. Friction clutches for the shafts O and P are indicated diagrammatically at O', O² and P' so that they may be reversed or disconnected from the main shaft N at will. The support or bearing block V for the shaft R is preferably fixed upon the base of the machine. In order to adapt the machine for work of less length, the bearing block W for the chuck C is made longitudinally adjustable along rails X, being fastened in any desired position of adjustment by means of bolts Y; nice adjustments of the distance being effected by means of a screw shaft Z which controls the position of the chuck in its bearing.

A convenient means of rotating the carborundum wheels is by using a separate motor for each wheel and mounting it directly on the carriage of such wheel so as to be adapted to operate it in all positions. For example, on the carriages F, F' there are mounted electric motors $a$ with horizontal shafts and belt pulleys $b$ driving belt pulleys $c$ on the shafts of the wheels. Each of the motors is substantially inclosed by a top plate to keep out the dust, a hand-hole plate $d$ being preferably provided over each of the pulleys $c$ (lower part of Fig. 1) so as to permit ready access thereto for applying or adjusting the belt, oiling etc.

The fluting wheels have motors $e$ with vertical axes and belt pulleys $f$ for driving pulleys $g$ on the vertical shafts of the cutters. The parts in this case are also protected by a surrounding casing, the casing for each carriage being cut away at the back and some distance over the top to permit access to the motors and other mechanisms carried on the carriages. A hand-hole plate $h$ (Fig. 4) gives access to the pulley on the shaft of the fluting cutter. Hoods of any desired construction are arranged to protect the operator from the several wheels, such, for example, as the hoods $j$ for the rounding cutters and $k$ for the fluting cutters. Nozzles $l$ may be arranged at suitable points to supply water to any or all of the cutting wheels. A platform $m$ may be detachably connected to the base of the carriage F' from which the operator may have convenient access to the controlling mechanism hereinafter described, and a similar platform may be provided for the carriage G', these platforms being made detachable so as to economize space by removing them when their respective carriages are at the ends of the machine and out of use.

Very few columns are made with their surfaces truly cylindrical. Usually they are of somewhat greater diameter between the ends than at the ends. With this machine they are automatically shaped to any desired diameter at each point in their length, the shaping being effected preferably by transverse movements of the carriages. For this purpose the base J of each carriage is provided with rails $n$ extending transversely and upon these slides an upper base $o$ of the carriage, the motor and other mechanisms being mounted directly upon this upper base.

The transverse movement may be effected by various types of mechanism. I have shown in connection with the rounding cutters a mechanical device for effecting the movements, and which is controlled by fluid pressure. In connection with the fluting cutters I have shown a fluid-pressure mechanism which directly effects the movements of the carriages. Either or any other suitable mechanism may be used for the purpose.

Referring first to the carriages F, F', there are provided on the bases J suitable bearings $p$ for the outer ends of short shafts $q$ whose inner ends are threaded and pass through nuts $r$ upon the inner side walls of the carriages. Preferably a pair of shafts $q$ is used for each carriage and, being arranged a substantial distance apart and working synchronously, they maintain the carriage in correct line so as to insure its sliding easily in its transverse movement. Passing through the bearing block $p$ are short longitudinal shafts $s$, $s'$ which drive the shafts $q$ by means of worm gearing, and which are synchronized with each other by means of shafts $t$, $t'$ extending transversely of the machine and connected to each other by means of an intermediate section $u$ (Fig. 5) arranged to be removed when the carriages are to be shifted endwise beyond the range of the work. The shaft s is arranged for power operation by means of a gear v carried thereon and engaging a pinion w on the shaft of a fluid-pressure operated motor x. This motor may be of the type used with Ingersoll-Rand rotary drills or of any other suitable type. The shaft s' on the other hand, is arranged for operation by a hand wheel y mounted directly thereon. The operation of either of the shafts s or s' causes the operation of the other also and causes a movement of the carriages F and F' inward or outward simultaneously and to the same extent (the shaft t' sliding through its pinion as shown in Fig. 1).

Means are provided whereby at each point in their longitudinal travel the carriages F, F' take a determined lateral position. At one side of the machine, preferably the side opposite the operator, there is arranged a guide preferably in the form of a thin metal blade z extending longitudinally and adapted to be given a shape corresponding to the desired contour of the column by means of a series of hand screws 2 at short intervals, connected to the flexible guide and screwing through a rigid supporting bar 3. Upon the guide z there is a slide 4 which partakes of the longitudinal movement of the carriage F and is transversely moved according to the contour of the guide, and which by its transverse movements controls the operation of the fluid motor x. A valve casing 5 is mounted upon the slide 4 and moves therewith upon a valve stem connected with a sleeve 6, which is set on the rod 7. The relative positions of the valve casing and stem determine the admission of fluid to the motor x and so determine the operation of the shaft s as hereinafter described more fully. In order to utilize the power of the motor x without shifting the slide 4 and valve casing 5, the rod 7 may be operated by hand. For this purpose it is made to extend across to the operator's side of the machine as indicated best in Fig. 5 and is feathered through a pinion 8 fixedly mounted on the carriage F' and engaging a pinion 9 on the lower end of a vertical shaft 10 carrying at its upper end a hand wheel 11 within easy reach of the operator. The rod 7 is also threaded through a nut 12 fixed on the side of the carriage F. This nut ordinarily prevents longitudinal movement of the rod so as to make the movements of the valve casing effective and, when the casing is held stationary, permits longitudinal movement of the rod by rotating the hand wheel 11 and thus permits an operation of the valve which controls the admission of fluid to the motor x. In connection with the carriages G and G' there is a similar slide 4 carrying a valve casing 5 which has a reciprocating valve rod connected by an arm to the sleeve 6 ordinarily fixed on the rod 7' which, in this case, is rotatable but fixed against longitudinal motion to the carriage G. The carriages G, G' are transversely moved by piston rods 13, one at each of the opposite sides of each carriage and entering cylinders 14, the valves of which are controlled similarly to the valves 5; that is to say, there is upon each of the carriages G, G' carrying the cylinders 14, a valve casing 15 (similar to that of the valve 5), which valve moves with the carriage and the cylinder, and the valve rod of which is connected to a sleeve 16 threaded on a shaft 17 extending transversely across the machine and common to the two carriages. The valve 5 controls the admission and exhaust from a fluid-pressure motor, preferably an air motor 18 so as to rotate the shaft 17 in one or the other direction as desired so as to shift the rods of the valves 15 and regulate the admission of the pressure fluid, preferably water on account of its rigidity, to the cylinders 14. For effecting a transverse movement of the carriages without longitudinal movement, the shaft 7' is made operable by hand through a pinion 19 thereon engaged with a gear 20 upon a shaft 21 running across to the carriage G' where it is feathered through a pinion 22 fixed upon the carriage and engaging a pinion 23 upon the lower end of the vertical shaft 24 which carries at its upper end a hand wheel 25 within easy reach of the operator.

Returning now to the specific construction of the controlling air valve, reference is made particularly to Figs. 6 to 9. The flexible supply pipes are omitted for clearness. The guide z preferably runs between rollers 26, 27, the latter of which is carried by a pair of plates 28, 29, the latter adapted to be adjusted in a slot in the main slide 4 and clamped at any desired point therein. The slide 4 rests upon a suitable extension of the upper base o of the carriage, being free to slide in a transverse direction thereon and carries on its upper face the valve casing 5. The valve may be of the double piston type indicated and connected to the sleeve 6 by an arm 30 upon which the valve rod 31 is adjustably connected. The rod 7 is adjustable and held by set screws as shown upon an intermediate sleeve 32 which has shoulders engaging the sleeve 6 so that the latter partakes of the reciprocating movements of the rod 7, the sleeve 6 being held down upon the slide 4 by means of bolts 33 passing freely through slots in flanges of the sleeve. The set-screws are indicated at 32ª, Fig. 6.

Referring now to Fig. 10, and supposing G to represent a carriage of which the hydraulic cylinder is represented at 14ª and the piston rod 13ª, and supposing that the intermediate compressed air valve - operating mechanism is eliminated and that a shifting of the valve rod 31ª to the right admits water to the righthand side of the cylinder 14ª and discharges it from the lefthand side, and that a relative movement of the valve rod in the opposite direction produces an opposite flow of the water, then when the guide z moves inward and pushes the valve casing 5 inward, it will also move the carriage G inward which movement of the carriage will cause a corresponding inward movement of the valve rod 31ª (by pulling the rod 7' and sleeve 6, Fig. 1) which will bring the valve back to the starting position with all ports closed, and will hold the carriage stationary in the position to which it has been moved. The opposite carriage G' moves with the carriage G inward or outward. Similarly if the valve rod 31ª be moved by hand say to the left by suitably rotating the shaft 17 and gears 19 and 20 and rod 7', the valve will cause a movement of the carriage to the right sufficient to carry the valve rod back to its starting point relatively to the valve casing.

The carriages F' and G' are provided not only with the hand wheels 11 and 25 for controlling the lateral positions of the carriages, but also with electric switches 34 for starting or stopping the cutters and with valves 35, 36 for controlling the rotation of the work and the longitudinal travel of the carriages. The several hand operated controllers described are arranged within easy reach of an operator standing on one of the two platforms m which are attached to the corresponding carriages and travel with the carriages. They may, for example, be bolted to the carriages by means of straps, the unbolting of which permits the ready removal of the platform and that carriage which is out of use.

The internal construction of the valves 35 and 36 may be considerably varied. In Fig. 11 they connect with flexible hose 37, 38, which carry the necessary number of tubes to connect with the ports of the valves. For example, 35 is a 3-way valve as indicated in Fig. 12 and has connections with a pressure pipe 39 and with an outlet passage indicated by 40, and with a service pipe 41 leading into the upper end of a cylinder 42, the piston rod 43 of which operates an arm 44 upon a rocking shaft 45 which has at its opposite end a corresponding arm 46 for raising and lowering the clutch member P'. The cylinder 42 is of the type usual in connection with compressed air, the piston being moved downwardly by the air when pressure is applied, or upward by a spring when the pressure is withdrawn. The valve 35 therefore controls the operation of the vertical rod P at the end of the lever which rotates the work or holds it stationary. The valve 36 may be a 4-way valve with a pressure inlet 47 and outlet 48, and a pair of branches 49 leading to the ends of cylinders 50 which control the operation of the clutches O', O². The clutches may be operated similarly either from the carriage F' or from the carriage G'.

Although I have described with great particularity of detail certain specific embodiments of the invention, yet it is not to be understood therefrom that the invention is restricted to the specific embodiment disclosed. Various modifications thereof in detail and in the arrangement and combination of the parts may be made by those skilled in the art without departure from the invention.

What I claim is:—

1. A machine for working marble including in combination means for engaging the ends of a column and rotating it, rounding cutters adapted to engage said column, means for moving said rounding cutters longitudinally of said column to cut it round throughout its length as it rotates, means for causing said rounding cutters to be simultaneously and automatically moved transversely to vary the diameter at different points in the length of the column, manual adjusting means to produce a determined diameter at any desired point in their longitudinal travel, fluting cutters, means for moving them longitudinally, means for simultaneously and automatically moving them transversely, means for adjusting them for a determined diameter at any point, and means for moving each class of cutters beyond an end of the column to permit the other class to travel from end to end of the column.

2. A machine for working marble including in combination means for engaging the ends of a column and rotating it, rounding cutters adapted to engage said column, means for moving said rounding cutters longitudinally of said column to cut it round throughout its length as it rotates, means for causing said rounding cutters to be simultaneously and automatically moved transversely to vary the diameter at different points in the length of the column, manual adjusting means to produce a determined diameter at any desired point in their longitudinal travel, fluting cutters, means for moving them longitudinally, means for simultaneously and automatically moving them transversely, means for adjusting them for a determined diameter at any point, and means for moving each class of cutters beyond an end of the column to permit the other class to travel from end to end of the column, said rounding cutters consisting of rapidly rotating carborundum wheels having axes parallel to the axis of the column, and said fluting cutters consisting of rapidly rotating carborundum wheels having axes perpendicular to the axis of the column.

3. A machine for working marble including in combination means for engaging the ends of a column and rotating it, rounding cutters adapted to engage said column, means for moving said rounding cutters longitudinally of said column to cut it round throughout its length as it rotates, means for causing said rounding cutters to be simultaneously and automatically moved transversely to vary the diameter at different points in the length of the column, manual adjusting means to produce a determined diameter at any desired point in their longitudinal travel, fluting cutters, means for moving them longitudinally, means for simultaneously and automatically moving them transversely, means for adjusting them for a determined diameter at any point, and means for moving each class of cutters beyond an end of the column to permit the other class to travel from end to end of the column, said rounding cutters consisting of rapidly rotating carborundum wheels having axes parallel to the axis of the column, and said fluting cutters consisting of rapidly rotating carborundum wheels having axes perpendicular to the axis of the column, and motors for said cutters mounted in substantially fixed relation thereto and partaking of the several movements thereof.

4. A machine for working marble including in combination means for engaging the ends of a column and rotating it, a pair of rounding-cutter carriages at opposite sides of the column, a rounding cutter and an operating motor therefor carried by each of said carriages; a similarly arranged pair of fluting-cutter carriages, a fluting cutter and an operating motor therefor carried by each of said carriages, means for moving each of said four carriages longitudinally, and means for simultaneously and automatically moving the opposite carriages of each pair toward or away from each other, means for manually adjusting the opposite carriages of each pair toward or away from each other, means for supporting the carriages permitting the rounding-cutter carriages to be moved longitudinally beyond one end of the column and the fluting-cutter carriages beyond the other end.

5. A machine for working marble including in combination means for rotating a column, a rounding cutter consisting of a rapidly rotating carborundum wheel with its axis parallel to that of the column and adapted to engage said column and to be moved longitudinally thereof to cut it round throughout its length as it rotates, and a fluting cutter on the same side of the machine and consisting of a rapidly rotating carborundum wheel with its axis transverse to the column also adapted to be moved longitudinally in engagement with said column.

6. A machine for working marble including in combination means for rotating a column, a rounding cutter adapted to engage said column, means for moving said rounding cutter longitudinally of the column to cut it round throughout its length as it rotates, a fluting cutter on the same side of the machine and means for moving it also longitudinally in engagement with said column, and means for supporting said cutters permitting each of them to be moved out of the way to permit the other to travel from end to end of the column.

7. A machine for working marble including in combination means for rotating a column, a rounding cutter, means for moving said cutter longitudinally of the column, to cut it round throughout its length as it rotates, and means for moving said cutter simultaneously and automatically transversely to vary the diameter at different points in the length of the column, a fluting cutter on the same side of the machine and means for moving it also longitudinally and means for moving it simultaneously and automatically transversely.

8. A machine for working marble including in combination means for rotating a column, a rounding cutter, means for moving said cutter longitudinally of the column to cut it round throughout its length as it rotates, and means for moving said cutter simultaneously and automatically transversely to vary the diameter at different points in the length of the column, a fluting cutter on the same side of the machine and means for moving it also longitudinally and means for moving it simultaneously and automatically transversely and means for supporting said cutters permitting each of them to be moved out of the way to permit the other to travel from end to end of the column.

9. A machine for working marble including in combination means for rotating a column, a rounding cutter adapted to engage said column, means for moving said cutter longitudinally to cut the column round throughout its length as it rotates, a fluting cutter and means for moving it longitudinally, a common shaft for giving longitudinal movement to said cutters, and means for detachably engaging said cutters with said shaft.

10. A machine for working marble including in combination a fluting cutter, means for giving a longitudinal movement thereto, and means for simultaneously and automatically giving a transverse movement to said cutter.

11. A machine for working marble including in combination a cutter engaging the work, and means for effecting a transverse movement of the cutter comprising a valve, a guide operating said valve, and a fluid-pressure device controlled by said valve.

12. A machine for working marble including in combination a cutter engaging the work and means for effecting a transverse movement of the cutter comprising a valve, a guide operating said valve, and a fluid-pressure device controlled by said valve, and screw mechanism engaging the support of said cutter and operated by said fluid-pressure device.

13. A machine for working marble including in combination a cutter engaging the work, and means for effecting a transverse movement of the cutter comprising a valve manually controlled, means for operating said valve, and a fluid-pressure device controlled by said valve.

14. A machine for working marble including in combination a cutter engaging the work and means for effecting a transverse movement of the cutter comprising a valve manually controlled, means for operating the stem of said valve, a guide moving the casing of said valve, and a fluid-pressure device controlled by said valve.

15. A machine for working marble including in combination a cutter at each side of the work a single guide and means controlled by said guide for effecting simultaneous movements of said cutters toward or away from each other.

16. A machine for working marble including in combination a cutter at each side of the work, means for effecting simultaneous movements of said cutters toward or away from each other comprising a valve, a guide operating said valve, and a fluid-pressure device controlled by said valve.

17. A machine for working marble including in combination a cutter at each side of the work, means for effecting simultaneous movements of said cutters toward or away from each other comprising a valve manually controlled, means for operating said valve, and a fluid-pressure device controlled by said valve.

18. A machine for working marble, including in combination means for rotating the work, a cutter arranged to travel longitudinally along the work, and manual controlling means moving with said cutter for controlling the rotation of the work and the longitudinal movement of the cutter.

19. A machine for working marble, including in combination means for rotating the work, a cutter, a longitudinally moving carriage carrying said cutter, a motor for said cutter carried by said carriage, and means on said carriage for controlling the work-rotating means and for controlling the movement of the carriage.

20. A machine for working marble, including in combination means for rotating the work, a carriage G' adapted to carry a cutter and a motor therefor, means for longitudinally-moving said carriage, a main shaft for transmitting its movement to the work rotating means and to the carriage moving means, pneumatic devices controlling said carriages, and valves controlling said pneumatic devices and carried by said carriage.

21. A machine for working marble, including in combination a carriage G', mechanism for moving the same longitudinally, mechanism for moving the same laterally, a motor on said carriage and a cutter operated thereby, mechanism for rotating the work, and hand controlling devices carried by said carriage for controlling the motor and the several mechanisms.

In witness whereof, I have hereunto signed my name in the presence of two subscribing witnesses.

JOHN ROYDEN PEIRCE.

Witnesses:
 DOMINGO A. USINA,
 THEODORE T. SNELL.